United States Patent
Kim et al.

(10) Patent No.: US 10,218,003 B2
(45) Date of Patent: Feb. 26, 2019

(54) ANODE AND SECONDARY BATTERY INCLUDING THE SAME

(71) Applicant: SAMSUNG SDI CO., LTD., Yongin-si, Gyeonggi-do (KR)

(72) Inventors: Youngeun Kim, Yongin-si (KR); Eunjung Kim, Yongin-si (KR); Sangwoon Yang, Yongin-si (KR); In Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 184 days.

(21) Appl. No.: 15/091,517

(22) Filed: Apr. 5, 2016

(65) Prior Publication Data
US 2016/0293961 A1    Oct. 6, 2016

(30) Foreign Application Priority Data

Apr. 6, 2015 (KR) .................. 10-2015-0048426

(51) Int. Cl.
| | | |
|---|---|---|
| *H01M 4/62* | (2006.01) | |
| *H01M 10/0525* | (2010.01) | |
| *H01M 4/13* | (2010.01) | |
| *H01M 4/04* | (2006.01) | |
| *H01M 4/133* | (2010.01) | |
| *H01M 4/1393* | (2010.01) | |
| *H01M 4/36* | (2006.01) | |
| *H01M 4/587* | (2010.01) | |
| *H01M 4/02* | (2006.01) | |
| *H01M 10/052* | (2010.01) | |

(52) U.S. Cl.
CPC ......... *H01M 4/625* (2013.01); *H01M 4/0404* (2013.01); *H01M 4/133* (2013.01); *H01M 4/1393* (2013.01); *H01M 4/364* (2013.01); *H01M 4/587* (2013.01); *H01M 10/052* (2013.01); *H01M 2004/021* (2013.01)

(58) Field of Classification Search
CPC .... H01M 4/625; H01M 4/0404; H01M 4/133; H01M 4/1393; H01M 4/364; H01M 4/587; H01M 2004/021; H01M 10/052
See application file for complete search history.

(56) References Cited

U.S. PATENT DOCUMENTS

| | | | |
|---|---|---|---|
| 2002/0086211 A1* | 7/2002 | Umeno | H01M 4/0428 |
| | | | 429/231.4 |
| 2007/0178382 A1 | 8/2007 | Kim et al. | |
| 2010/0159330 A1* | 6/2010 | Sugiura | H01M 4/131 |
| | | | 429/231.4 |
| 2013/0251620 A1* | 9/2013 | Suzuki | H01M 4/133 |
| | | | 423/448 |
| 2015/0064560 A1* | 3/2015 | Shon | H01M 4/485 |
| | | | 429/221 |
| 2016/0248085 A1* | 8/2016 | Umeyama | H01M 4/13 |

FOREIGN PATENT DOCUMENTS

| | | |
|---|---|---|
| JP | 2003-187798 A | 7/2013 |
| KR | 10-2007-0078536 A | 8/2007 |
| KR | 10-2009-0076275 A | 7/2009 |
| KR | 10-2011-0115025 A | 10/2011 |

OTHER PUBLICATIONS

Patent Abstract and Machine English Translation of JP 2003-187798 A, Jul. 4, 2013, 22 Pages.

* cited by examiner

*Primary Examiner* — Muhammad S Siddiquee
(74) *Attorney, Agent, or Firm* — Lewis Roca Rothgerber Christie LLP (57) ABSTRACT

An anode and a secondary battery including the anode, which can improve charge and discharge efficiency and can reduce or suppress precipitation of metal ions, are provided. The anode includes a negative electrode active material layer on a current collector, the negative electrode active material layer including a negative electrode active material, a binder, and a conductive material. The negative electrode active material includes at least one pore on a surface thereof, and the conductive material is located at the pore of the negative electrode active material.

13 Claims, 6 Drawing Sheets

ANODE AND SECONDARY BATTERY INCLUDING THE SAME

CROSS-REFERENCE TO RELATED APPLICATION

This application claims priority to and the benefit of Korean Patent Application No. 10-2015-0048426 filed on Apr. 6, 2015 in the Korean Intellectual Property Office, and all the benefits accruing therefrom under 35 U.S.C. 119, the entire contents of which are incorporated herein by reference.

BACKGROUND

1. Field

Embodiments of the present disclosure relate to an anode and a secondary battery including the same.

2. Description of the Related Art

Batteries transform chemical energy (generated from an electrochemical redox reaction of a chemical material in the battery) into electrical energy. Some batteries are classified as primary batteries, which are designed to be disposed of after all or substantially all of the useful energy of the battery is consumed. Other batteries are classified as rechargeable batteries, which are designed to be recharged many times. Rechargeable batteries may be charged/discharged many times through the reversible transformation of chemical energy to electrical energy.

Recent developments in high-tech electronics have allowed electronic devices to become small and light in weight, leading to an increase in the number of portable electronic devices. As the power sources for such portable electronic devices, the demand for batteries having high energy density is increasing, and research is actively being conducted into lithium rechargeable batteries.

In general, an anode of a lithium rechargeable battery is formed by preparing a negative electrode slurry by mixing a negative electrode active material, a binder, and a conductive material, coating the slurry on the anode, drying and rolling.

SUMMARY

Embodiments of the present disclosure provide an anode which can improve charge and discharge efficiency, and a secondary battery including the anode.

Embodiments of the present disclosure provide an anode which can reduce or suppress precipitation of metal ions, and a secondary battery including the anode.

The above and other aspects of embodiments of the present disclosure will be described in, or be apparent from, the following description of example embodiments.

According to an aspect of embodiments of the present disclosure, there is provided an anode of a secondary battery including a negative electrode active material layer on a current collector, the negative electrode active material layer including a negative electrode active material, a binder and a conductive material, wherein the negative electrode active material includes at least one pore formed on its surface, and the conductive material is inserted into the pore of the negative electrode active material.

The conductive material may be spherically shaped.

The pore of the negative electrode active material may have a width in a range of 50 nm to 10 μm and a depth in a range of 20 nm to 10 μm.

The conductive material may have a diameter in a range of 10 nm to 50 nm.

The negative electrode active material layer may be formed from a negative electrode slurry including the conductive material may in an amount of 1 wt % to 5 wt % based on a total weight of the negative electrode slurry.

The conductive material may have an oil absorption number in a range of 100 ml/100 g to 200 ml/100 g.

A specific resistance of the conductive material may be smaller than 0.1 Ωm.

The conductive material may be selected from the group consisting of super P, acetylene black, ketjen black, Denka black, thermal black, channel black and carbon black.

The conductive material may be formed to have a lower structure.

The conductive material may have a specific surface area of 150 $m^2/g$.

According to another aspect of embodiments of the present disclosure, a secondary battery includes an anode including a negative electrode material layer including a negative electrode active material, a binder, a conductive material, and a current collector coated by the negative electrode active material layer, wherein the negative electrode active material includes at least one pore formed on its surface, and the conductive material is inserted into the pore of the negative electrode active material.

According to still another aspect of embodiments of the present disclosure, a battery module includes a secondary battery including an anode including a negative electrode active material layer including a negative electrode active material, a binder, a conductive material, and a current collector coated by the negative electrode active material layer, wherein the negative electrode active material includes at least one pore formed on its surface, the conductive material is inserted into the pore of the anode, and the secondary battery includes a plurality of secondary batteries.

According to still another aspect of embodiments of the present disclosure, a battery pack includes a secondary battery including an anode including a negative electrode slurry including a negative electrode active material, a binder and a conductive material and a current collector coated by the negative electrode slurry, and a battery module including a plurality of secondary batteries, wherein the negative electrode active material includes at least one pore formed on its surface, the conductive material is inserted into the pore of the anode, and the battery pack includes a plurality of battery modules.

According to still another aspect of embodiments of the present disclosure, a device includes a secondary battery including an anode including a negative electrode slurry including a negative electrode active material, a binder and a conductive material and a current collector coated by the negative electrode slurry, a battery module including a plurality of secondary batteries, and a battery pack including a plurality of battery modules, wherein the negative electrode active material includes at least one pore formed on its surface, the conductive material is inserted into the pore of the anode, and the device is driven by power from the battery pack.

The device may be a power storage device or a driving device of an electric vehicle, a hybrid electric vehicle or a plug-in hybrid electric vehicle.

As described above, the anode and the secondary battery including the same according to embodiments of the present disclosure can improve charge and discharge efficiency.

In addition, the anode and the secondary battery including the same according to embodiments of the present disclosure can reduce or suppress precipitation of metal ions.

BRIEF DESCRIPTION OF THE DRAWINGS

The above and other features of embodiments of the present disclosure will become more apparent from the following description of example embodiments thereof with reference to the attached drawings in which.

DETAILED DESCRIPTION

Hereinafter, examples of embodiments of the disclosure will be described in detail with reference to the accompanying drawings such that they can readily be made and used by those skilled in the art.

As used herein, the term "and/or" includes any and all combinations of one or more of the associated listed items. The terminology used herein is for the purpose of describing example embodiments only and is not intended to be limiting of the invention. As used herein, the singular forms are intended to include the plural forms as well, unless the context clearly indicates otherwise. It will be further understood that the terms "comprises" and/or "comprising," and similar terms, when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments of the present invention refers to "one or more embodiments of the present disclosure."

It will be understood that, although the terms first, second, etc. may be used herein to describe various elements, these elements should not be limited by these terms. These terms are only used to distinguish one element from another element.

In the following detailed description, only certain embodiments of the present disclosure are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Further, when a first element is referred to as being "coupled" or "connected" to a second element, it can be directly coupled or connected to the second element or be indirectly coupled or connected to the second element with one or more intervening elements interposed therebetween. Like reference numerals designate like elements throughout the specification.

Figure 1:
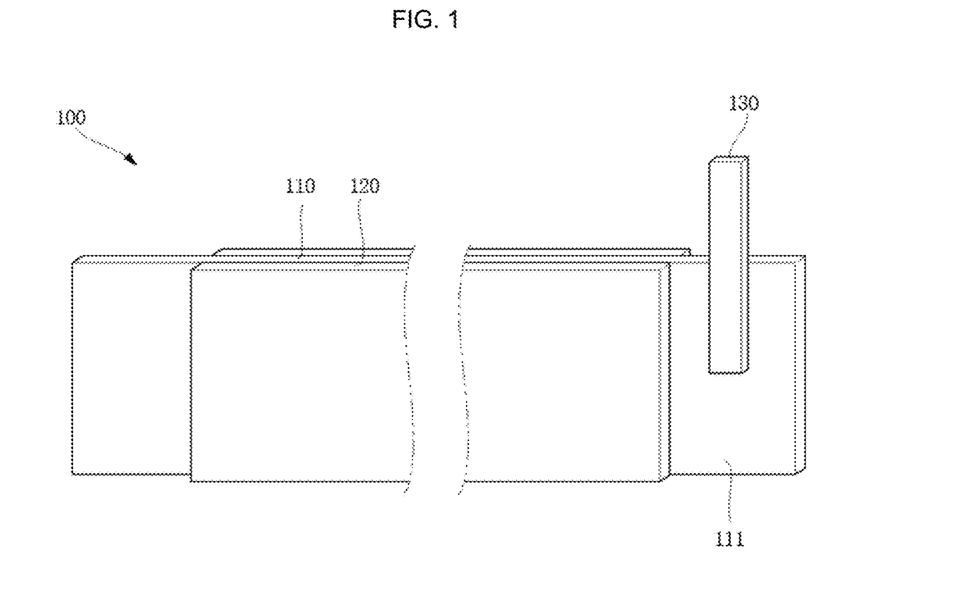
FIG. 1 is a perspective view of an anode according to an embodiment of the present disclosure.
Figure 2A:
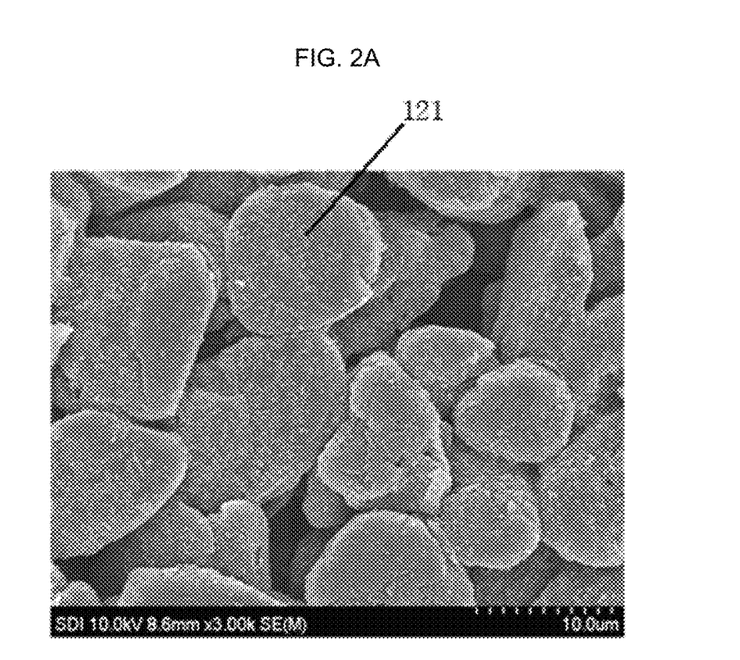
FIGS. 2A and 2B are scanning electron microscope (SEM) images illustrating an active material layer of the anode of FIG. 1.
Figure 2B:
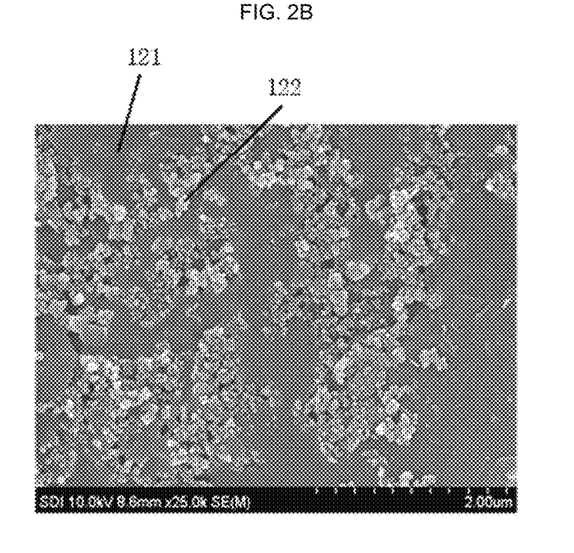
Figure 2C:
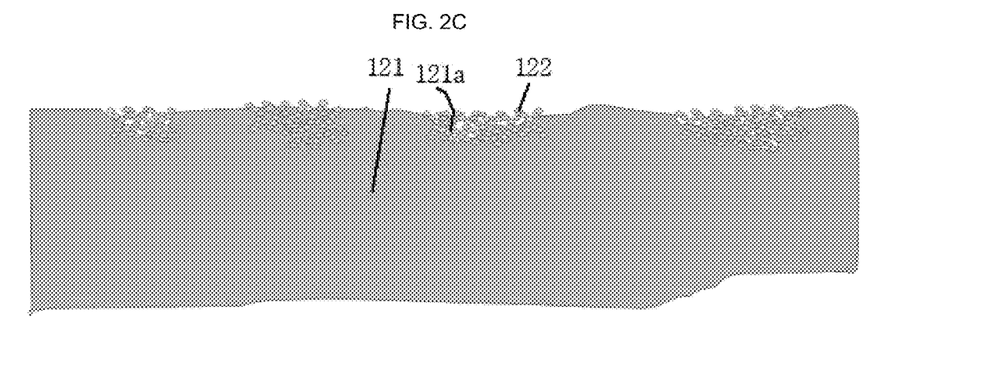
FIGS. 2C and 2D are schematic views illustrating a negative electrode active material and a conductive material according to an embodiment of the present disclosure.
Figure 2D:
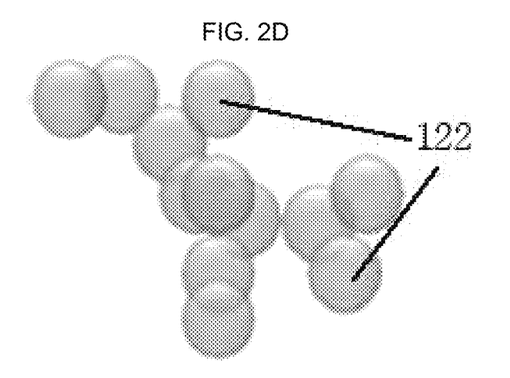
Figure 2E:
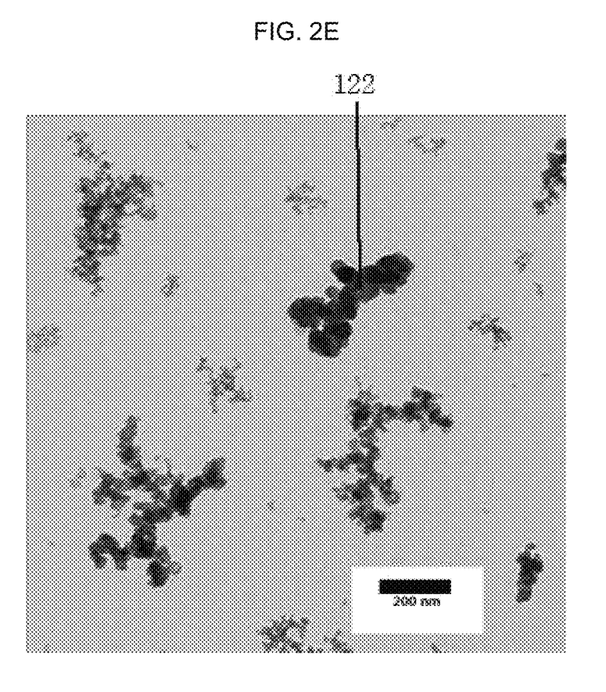
FIGS. 2E and 2F are SEM photographs illustrating a conductive material of the anode shown in FIG. 1.
Figure 2F:
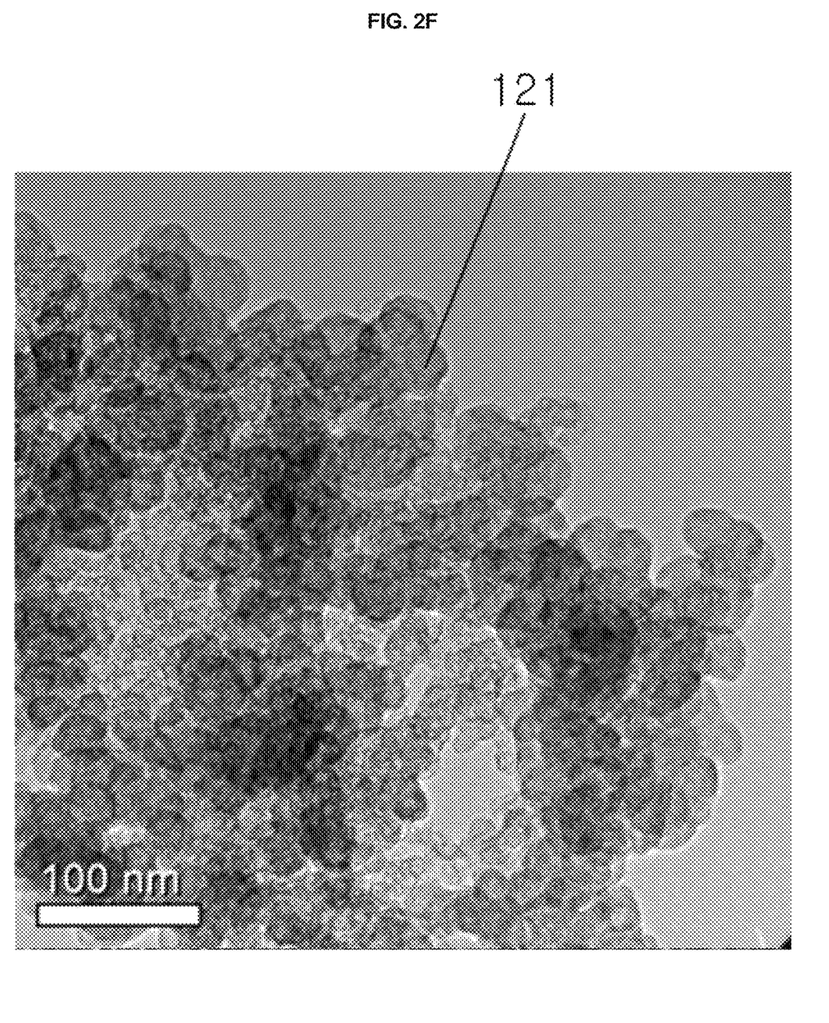

FIG. 1 is a perspective view of an anode according to an embodiment of the present disclosure.

Referring to FIG. 1, the anode 100 according to an embodiment of the present disclosure may include a negative electrode current collector 110, a negative electrode active material layer 120, a negative electrode uncoated portion 111 and a negative electrode tab 130.

The negative electrode current collector 110 may be made of (e.g., include) a conductive metal capable of collecting electrons from the negative electrode active material layer 120 and moving the collected electrons to an external circuit.

The negative electrode active material layer 120 is formed by mixing a negative electrode active material and a binder, and coating the resultant on at least one surface of the negative electrode current collector 110 to a set or predetermined thickness.

The negative electrode active material may include a carbonaceous material capable of reversibly intercalating/deintercalating lithium ions, a lithium metal, a lithium metal alloy, a material capable of doping/undoping lithium, and/or a transition metal oxide.

Any suitable carbon-based negative electrode active material that is generally used or available in the art of secondary batteries may be used as the carbonaceous material capable of reversibly intercalating/deintercalating lithium ions, and representative examples thereof may include crystalline carbon, amorphous carbon, or mixtures thereof. The crystalline carbon may include graphite such as shapeless, plate-shaped, flake-shaped, spherical, or fibrous natural graphite or artificial graphite, and the amorphous carbon may include soft carbon (e.g., low-temperature fired carbon) or hard carbon, mesophase pitch carbide, fired coke, etc.

The lithium metal alloy may include alloys of lithium and a metal selected from the group consisting of Na, K, Rb, Cs, Fr, Be, Mg, Ca, Sr, Si, Sb, Pb, In, Zn, Ba, Ra, Ge, Al, and Sn.

The material capable of doping/undoping lithium may include Si, $SiO_x$ ($0<x<2$), a Si—C compound, a Si-Q alloy (where Q is an alkaline metal, an alkaline earth metal, group 13-16 elements, a transition metal, a rare earth element, or a combination thereof, and is not Si), Sn, $SnO_2$, a Sn—C compound, Sn—R (where R is an alkaline metal, an alkaline earth metal, group 13-16 elements, a transition metal, a rare earth element, or a combination thereof, and is not Sn), or $SiO_2$ mixed with at least one of these elements (e.g., Si, the $SiO_x$, the Si—C compound, the Si-Q alloy, Sn, $SnO_2$, the Sn—C compound, and/or Sn—R). Non-limiting examples of the Q and R elements may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

The transition metal oxide may include vanadium oxide, lithium vanadium oxide, and/or the like.

The binder improves the binding properties of the negative electrode active material particles to one another and also to the current collector. Representative non-limiting examples of the binder include polyvinylalcohol, carboxymethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

Referring to FIGS. 2A to 2F, the negative electrode active material 121 includes at least one pore 121a formed on its surface and the conductive material 122 is located at or inserted into the pore 121a of the negative electrode active material 121.

Here, the pore 121a of the negative electrode active material 121 has a width (e.g., a first pore diameter) in a range of 50 nm to 10 μm and a depth (e.g., a second pore diameter) in a range of 20 nm to 10 μm.

The conductive material 122 may be shaped to include spheres each having a diameter (e.g., an average particle diameter) in a range of 10 nm to 50 nm and may be selected from the group consisting of LITX200 (available from Cabot Corporation, Boston Mass.) and carbon black (e.g., super P, acetylene black, ketjen black, Denka black, thermal black, and channel black). For example, the conductive material may have a spherical shape.

When the diameter of the conductive material 122 is less than or equal to 50 nm, the conductive material 122 may selectively fill a portion of the pore 121a of the negative electrode active material 121 when the conductive material 122 is coated on the negative electrode active material 121. However, when the diameter of the conductive material 122 is greater than or equal to 30 nm, the conductive material 122 may be evenly or substantially evenly coated on the surface of the negative electrode active material 121 as well as the pore 121a of the negative electrode active material 121, so that the effect of activating electrochemically non-activated regions of the negative electrode active material 121 may be negligible. In some embodiments, the diameter of the conductive material 122 is 30 nm to less than 50 nm.

Here, the conductive material 122 may be formed to have a lower structure in which spherical primary particles are formed as a single carbon chain.

The conductive material 122 may have a weight ratio in a range of 1 wt % to 5 wt % based on the total weight of the negative electrode slurry. For example, the conductive material 122 may be present in the negative electrode slurry at a weight of 1 wt % to 5 wt % based on the total weight of the negative electrode slurry.

In some embodiments, the conductive material 122 has an oil absorption number of 100 ml/100 g to 200 ml/100 g. In some embodiments, a specific resistance of the conductive material 122 is smaller than 0.1 Ωm. For example, the conductive material 122 may have a specific surface area of 150 m$^2$/g The anode 100, a cathode and a separator may be wound or folded to be housed in a battery case (e.g., the anode 100, the cathode, and the separator may be stacked and wound together into a jelly roll). Next, an electrolyte is injected into the battery case and sealed by a sealing member, thereby completing a secondary battery. The battery case of the secondary battery may be a cylindrical type (or kind), a prismatic type (or kind) or a thin film type (or kind). In addition, the secondary battery may be a lithium ion battery.

In some embodiments, a protective circuit module (PCM) is coupled or connected to the secondary battery as a unit battery to form a battery module and a plurality of battery modules are electrically coupled or connected to one another, thereby forming a battery pack. The battery module may include a plurality of the secondary batteries.

In addition, the battery pack may be suitably used in a portable device, for example, in a mobile phone, a laptop computer, or the like, a device that utilizes high capacity and high output and operates at high temperatures, for example, an electric vehicle, a hybrid vehicle, or the like, in combination with an existing internal combustion engine, a fuel cell, a super capacitor, or the like. In addition, the secondary battery may be used in any suitable device that utilizes high capacity and high output and operates at high temperatures. In some embodiments, the device may include the battery pack, and the device is driven by power from the battery pack. For example, the device may be selected from a power storage device and a driving device of a vehicle selected from an electric vehicle, a hybrid electric vehicle, and a plug-in hybrid electric vehicle.

The following examples are presented for illustrative purposes only, and should not be interpreted as limiting the scope of this disclosure.

EXAMPLES

Example 1

A negative electrode slurry was prepared from a mixture including natural graphite, surface treated natural graphite, or artificial graphite as a negative electrode active material, carboxy methyl cellulose (CMC) as a binder and LITX200 as a conductive material mixed to a weight ratio of 96:1:3 of the negative electrode active material, the binder, and the conductive material, respectively.

The conductive material LITX200 has a lower structure having a primary particle size of 23 nm.

Here, the negative electrode slurry was initially stirred while adding cooling water one to three times, the slurry was then stabilized (i.e., the stirring was stopped) for a set or predetermined time period, and then the negative electrode slurry was stirred again while adding cooling water four to nine times.

The prepared negative electrode slurry was coated on a copper foil current collector, followed by drying and rolling, thereby fabricating an anode.

Comparative Example

A negative electrode slurry was prepared in the same manner as described with respect to Example 1, except that denka black having primary particles having a diameter of 31 nm and formed to have a higher structure than that of the LITX200 was used as the conductive material of the negative electrode slurry.

Property data of Example 1 and the Comparative Example were obtained and are listed in Table 1.

Figure 3A:
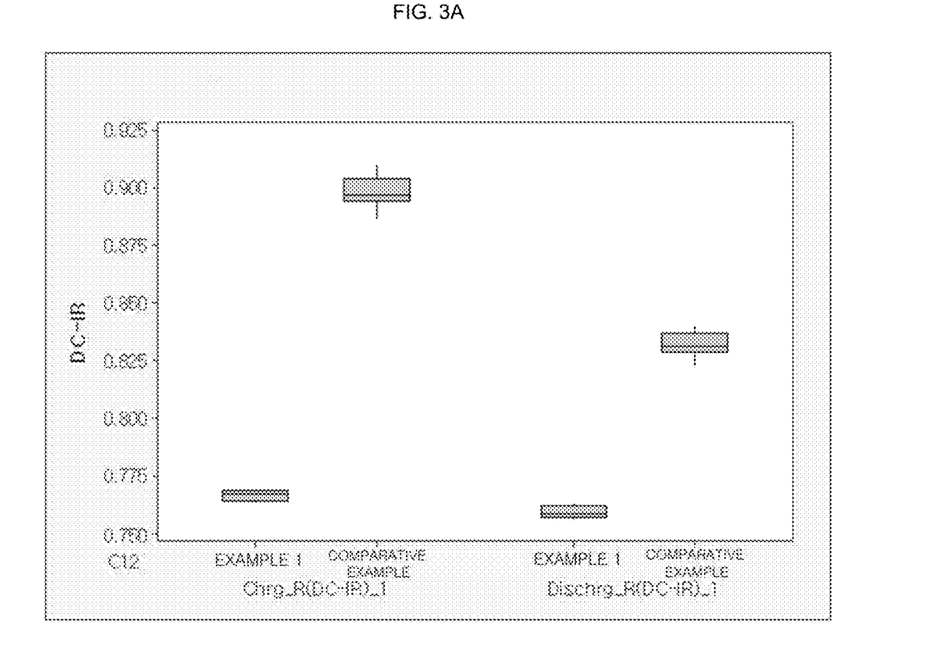
FIGS. 3A and 3B are graphs illustrating characteristic evaluation results of a Comparative Example and Example 1.
Figure 3B:
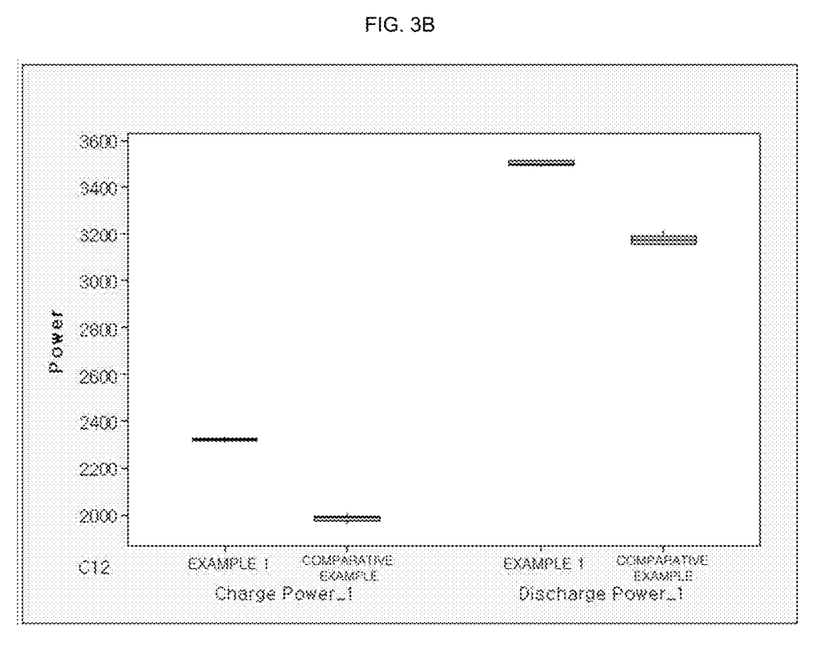

In addition, graphs representing evaluation results of the property data of Example 1 and the Comparative Example are illustrated in FIGS. 3A and 3B.

TABLE 1

| Item (Unit) | Example 1 | Comparative Example |
|---|---|---|
| Specific resistance (Ωm) | 0.09 | 0.45 |
| Specific surface area of conductive material (m$^2$/g) | 150 | 50~70 |
| Oil absorption number of conductive material (OAN)(ml/100 g) | 160 | 220~300 |
| Particle diameter of conductive material (nm) | 23 | 31 |
| Charge output (W) | 2319.8 | 1980.1 |

TABLE 1-continued

| Item (Unit) | Example 1 | Comparative Example |
|---|---|---|
| Discharge output (W) | 3503.5 | 3176.2 |
| Charge_R (DC-IR) | 0.77 | 0.90 |
| Discharge_R (DC-IR) | 0.76 | 0.83 |
| IR2 (mohm) | 0.41 | 0.47 |
| dV | 23.9 | 2.7 |

First, the conductive material of Example 1 is formed to have a lower structure in which the conductive material of Example 1 has a shorter carbon chain and a smaller primary particle diameter as compared to those of the Comparative Example.

The conductive material of Example 1 has a higher specific surface area than that of the Comparative Example, which increases electronic conductivity. In addition, a relatively shorter carbon chain and a relatively lower oil absorption number (OAN) of the conductive material of Example 1 may increase dispersive performance.

Therefore, even if a reduced amount of n-methyl-2-pyrrolidone (NMP) as a solvent is used (e.g., in preparing the negative electrode slurry) and an increased amount of solid matter is used in the conductive material of Example 1, it is possible to prepare a stabilized negative electrode slurry having the same or substantially the same viscosity as in a case of using the conductive material of the Comparative Example.

In addition, as described above, since the conductive material of Example 1 has a relatively smaller primary particle diameter, a relatively shorter carbon chain and has a relatively lower oil absorption number (OAN), it can be selectively inserted into only or substantially only active material pores of the negative electrode active material even when a small amount of the conductive material is utilized.

For example, the conductive material may be present in an amount of 1 wt % to 5 wt % relative to the total weight of the negative electrode slurry.

In addition, the conductive material of Example 1 is confirmed to have a specific resistance of 0.09 Ωm, which is much lower than that of the conductive material of the Comparative Example, i.e., 0.45 Ωm.

In addition, as shown in FIGS. 3A and 3B, the anode according to Example 1 exhibits constant current-internal resistance (DC-IR) drops in view of charge and discharge, as compared to the anode according to the Comparative Example.

For example, the anode according to Example 1 can improve rapid charging performance and can improve charge and discharge output (W) values.

While the anode and the secondary battery including the same of the present invention have been particularly shown and described with reference to example embodiments thereof, it will be understood by those of ordinary skill in the art that various changes in form and details may be made therein without departing from the spirit and scope of the present invention as defined by the following claims, and equivalents thereof.

What is claimed is:

1. An anode for a secondary battery, the anode comprising:
a negative electrode active material layer on a current collector, the negative electrode active material layer comprising:
a negative electrode active material, a binder, and a conductive material, wherein the negative electrode active material comprises at least one pore on a surface thereof, and the conductive material is located at the pore of the negative electrode active material,
wherein the conductive material has a diameter of 10 nm to 50 nm, and
wherein the pore of the negative electrode active material has a width of 50 nm to 10 μm, and a depth of 20 nm to 10 μm.

2. The anode of claim 1, wherein the conductive material has a spherical shape.

3. The anode of claim 1, wherein the negative electrode active material layer is formed from a negative electrode slurry comprising the conductive material in an amount of 1 wt % to 5 wt % based on a total weight of the negative electrode slurry.

4. The anode of claim 1, wherein the conductive material has an oil absorption number of 100 ml/100 g to 200 ml/100 g.

5. The anode of claim 1, wherein a specific resistance of the conductive material is smaller than 0.1 Ωm.

6. The anode of claim 1, wherein the conductive material comprises carbon black selected from the group consisting of acetylene black, thermal black, and channel black.

7. The anode of claim 1, wherein the conductive material is formed to have a lower structure.

8. The anode of claim 1, wherein the conductive material has a specific surface area of 150 m²/g.

9. A secondary battery comprising:
an anode comprising a negative electrode active material layer comprising:
a negative electrode active material, a binder and a conductive material on a current collector, wherein the negative electrode active material comprises at least one pore on a surface thereof, and the conductive material is located at the pore of the negative electrode active material,
wherein the conductive material has a diameter of 10 nm to 50 nm, and
wherein the pore of the negative electrode active material has a width of 50 nm to 10 μm, and a depth of 20 nm to 10 μm.

10. A battery module comprising:
a secondary battery comprising an anode comprising a negative electrode active material layer comprising:
a negative electrode active material, a binder and a conductive material on a current collector, wherein the negative electrode active material comprises at least one pore on a surface thereof, the conductive material is located at the pore of the negative electrode active material, and the secondary battery comprises a plurality of secondary batteries,
wherein the conductive material has a diameter of 10 nm to 50 nm, and
wherein the pore of the negative electrode active material has a width of 50 nm to 10 μm, and a depth of 20 nm to 10 μm.

11. A battery pack comprising a plurality of battery modules according to claim 10.

12. A device comprising the battery pack of claim 11, wherein the device is driven by power from the battery pack.

13. The device of claim 12, wherein the device is selected from a power storage device and a driving device of a vehicle selected from an electric vehicle, a hybrid electric vehicle, and a plug-in hybrid electric vehicle.

* * * * *